(12) United States Patent
Kwon et al.

(10) Patent No.: US 10,795,609 B2
(45) Date of Patent: Oct. 6, 2020

(54) MEMORY SYSTEM AND OPERATING METHOD OF THE SAME

(71) Applicant: SK hynix Inc., Gyeonggi-do (KR)

(72) Inventors: Jung-Hyun Kwon, Seoul (KR); Sang-Gu Jo, Gyeonggi-do (KR); Jong-Hyun Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 14 days.

(21) Appl. No.: 15/965,450

(22) Filed: Apr. 27, 2018

(65) Prior Publication Data
US 2019/0056888 A1    Feb. 21, 2019

(30) Foreign Application Priority Data

Aug. 17, 2017  (KR) .......................... 10-2017-0104298

(51) Int. Cl.
*G06F 3/06*    (2006.01)
*G06F 12/02*    (2006.01)

(52) U.S. Cl.
CPC .......... *G06F 3/0659* (2013.01); *G06F 3/0604* (2013.01); *G06F 3/064* (2013.01); *G06F 3/065* (2013.01); *G06F 3/0616* (2013.01); *G06F 3/0653* (2013.01); *G06F 3/0679* (2013.01); *G06F 12/0246* (2013.01)

(58) Field of Classification Search
CPC ...... G06F 3/0659; G06F 3/065; G06F 3/0604; G06F 3/064; G06F 3/0653

USPC ........................................................ 711/103
See application file for complete search history.

(56) References Cited

U.S. PATENT DOCUMENTS

2016/0188455 A1*  6/2016  Patel ................... G06F 12/0246
                                                           711/154

FOREIGN PATENT DOCUMENTS

KR    1020080030756    4/2008
KR    1020130076429    7/2013

* cited by examiner

*Primary Examiner* — Hua J Song
(74) *Attorney, Agent, or Firm* — IP & T Group LLP

(57) ABSTRACT

Disclosed is a memory system includes a memory device including a plurality of memory blocks, a write operation management circuit configured to update write operation counts for the plurality of memory blocks, a first block detector configured to detect a hot memory block based on a first operation count value corresponding to the write operation count of a first memory block on which a write operation has been performed among the plurality of memory blocks, a second detector configured to detect a cold memory block based on a second operation count value corresponding to the write operation count of each of second memory blocks adjacent to the first memory block, and a controller configured to copy, if the hot memory block and the cold memory block are detected by the first and second detectors, data of the detected hot memory block or data of the detected cold memory block.

22 Claims, 7 Drawing Sheets

| REGION | FLAG | TOTAL | BLOCK | CNT |
|---|---|---|---|---|
| RA1 | 1 | 1200 | BA1 | 110 |
| | | | BA2 | - |
| | | | BA3 | 95 |
| | | | BA4 | - |
| | | | ⋮ | ⋮ |
| RA2 | 1 | 1100 | BA1 | - |
| | | | BA2 | 45 |
| | | | BA3 | 65 |
| | | | BA4 | 35 |
| | | | ⋮ | ⋮ |
| RA3 | 0 | 700 | BA1 | 25 |
| | | | BA2 | 10 |
| | | | BA3 | - |
| | | | BA4 | - |
| | | | ⋮ | ⋮ |
| | | | AVG | 50 |

← WRITE

COPY

MEMORY SYSTEM AND OPERATING METHOD OF THE SAME

CROSS-REFERENCE TO RELATED APPLICATION

The present application claims priority under 35 U.S.C. § 119 to Korean Patent Application No. 10-2017-0104298, filed on Aug. 17, 2017, which is incorporated herein by reference in its entirety.

BACKGROUND

1. Field

Exemplary embodiments relate to a memory system including a nonvolatile memory device, and more particularly, to a memory system capable of reducing disturbance between adjacent regions in a nonvolatile device, and an operating method of the same.

2. Discussion of the Related Art

Semiconductor memory devices are chiefly classified into volatile and nonvolatile memory devices.

A volatile memory device has high write and read speeds, but loses data stored therein when power is turned off. Examples of a volatile memory device include a dynamic random-access memory (DRAM), a static RAM (SRAM), etc. On the other hand, a nonvolatile memory device has comparatively low write and read speed, but retains data stored therein even when power is cut off. Therefore, a nonvolatile memory device is used when there is a need for storing data which should be retained regardless of the status of the power supply. Representative examples of nonvolatile memory devices include a read only memory (ROM), a mask ROM (MROM), a programmable ROM (PROM), an erasable programmable ROM (EPROM), an electrically erasable programmable ROM (EEPROM), a flash memory, a phase change random access memory (PCRAM), a magnetic RAM (MRAM), a resistive RAM (RRAM), a ferroelectric RAM (FRAM), etc.

FIG. 1 is a diagram illustrating a memory cell array of a nonvolatile memory device. FIG. 1 illustrates a memory cell array of a PCRAM as an example of a nonvolatile memory device.

The memory cell array includes unit memory cells MC positioned at the junctions between bit lines BL and word lines WL. Each unit memory cell MC of the PCRAM may include a phase change resistor PCR and a PN diode D. The phase change resistor PCR may be formed of a phase change material layer interposed between an upper electrode and a lower electrode, so that when voltage and current are applied thereto, high temperature is induced in the phase change material layer, whereby an electricity conduction state may be changed depending on a change in resistance.

One side electrode of the phase change resistor PCR is coupled with a bit line BL, and the other side electrode thereof is coupled to a P-type region of the PN diode D. An N-type region of the PN diode D is coupled to a word line WL.

In the cell array, during a write operation, a ground voltage VSS is applied to a selected word line WL2, and a drive voltage Vd corresponding to write data is applied to a selected bit line BL2. In this case, unselected bit lines BL1 and BL3 floats, and unselected word lines WL1 and WL3 remain in a pumping voltage VPPX level, which is high.

When, voltages are applied to the selected word line WL2 and the bit line BL2 as described above, current flows in the memory cell MC disposed at the corresponding junction therebetween, whereby heat is generated. When a low-temperature heating state is made by a low current flowing for a predetermined time through the selected memory cell MC, the phase change resistor PCR of the memory cell MC is crystallized, that is, enters a set phase. Alternatively, when a high-temperature heating state is made by a high current flowing for a predetermined time, the phase change resistor PCR of the corresponding memory cell MC enters an amorphous phase, that is, a reset phase.

However, during a write operation, heat generated from a target memory cell may affect adjacent memory cells and multiple, repetitive write operations on the same memory cell may change data of adjacent memory cells and cause program disturbance.

Memory cells of a nonvolatile memory device may drift from a first-programmed state due to various reasons including program disturbance, read disturbance, charge drift, temperature drop, a change in accumulated write/erase cycles, abrasion, and so forth. Therefore, typically, a memory system including a nonvolatile memory device performs a refresh operation, before the reliability of programmed data is reduced by a programming drift. The refresh operation includes refreshing existing cells or rewriting stored data to new cells.

SUMMARY

Various embodiments of the present invention are directed to a memory system and an operating method thereof capable of preventing or reducing disturbance between adjacent regions of a memory device which may occur because of multiple write operations to the same memory region or cell. The memory system and operating method thereof may enhance the reliability of data storing.

In accordance with an embodiment of the present invention, a memory system includes: a memory device including a plurality of memory blocks; a write operation management circuit configured to update write operation counts for the plurality of memory blocks; a first block detector configured to detect a hot memory block based on a first operation count value corresponding to the write operation count of a first memory block on which a write operation has been performed among the plurality of memory blocks; a second detector configured to detect a cold memory block based on a second operation count value corresponding to the write operation count of each of second memory blocks adjacent to the first memory block; and a controller configured to copy, if the hot memory block and the cold memory block are detected by the first and second detectors, data of the detected hot memory block or data of the detected cold memory block.

In accordance with an embodiment of the present invention, an operating method for a memory system includes: updating write operation counts for a plurality of memory blocks according to a write operation; detecting a hot memory block based on a first operation count value corresponding to the write operation count of a first memory block on which the write operation has been performed among the plurality of memory blocks; detecting a cold memory block based on a second operation count value corresponding to the write operation count of each of second memory blocks adjacent to the first memory block; and copying, if the hot memory block and the cold memory block are detected, data of the detected hot memory block or data of the detected cold memory block.

In accordance with an embodiment of the present invention, a memory system includes: a memory device including a plurality of memory regions, each of which is formed of a plurality of memory blocks; a memory block detector configured to detect, based on write operation counts for the plurality of memory blocks, a first memory block on which a write operation has been performed among the plurality of memory blocks, and a second memory block adjacent to the first memory block as a hot memory block and a cold memory block, respectively; and a controller configured to copy, if the hot memory block and the cold memory block are detected by the memory block detector, data of the detected hot memory block or data of the detected cold memory block.

In accordance with an embodiment of the present invention, a memory system includes: a memory device including a plurality of memory regions each having a plurality of memory blocks; and a controller suitable for: detecting hot and cold memory regions among the memory regions at a program operation to one of the memory blocks; determining whether a currently programmed memory block is a hot memory block; determining, when the currently programmed memory block is determined as the hot memory block, whether one or more of memory blocks adjacent to the currently programmed memory block are cold memory blocks; and controlling the memory device to copy data of the hot and cold memory blocks into empty memory blocks of the hot and cold memory regions, respectively.

These and other features and advantages of the present invention will become apparent to those skilled in the art to which the present invention pertains from the following detailed description in reference to the accompanying drawings.

BRIEF DESCRIPTION OF THE DRAWINGS

FIGS. 3A and 3B are diagrams illustrating a mapping table illustrated in FIG. 2.

DETAILED DESCRIPTION

Figure 1:
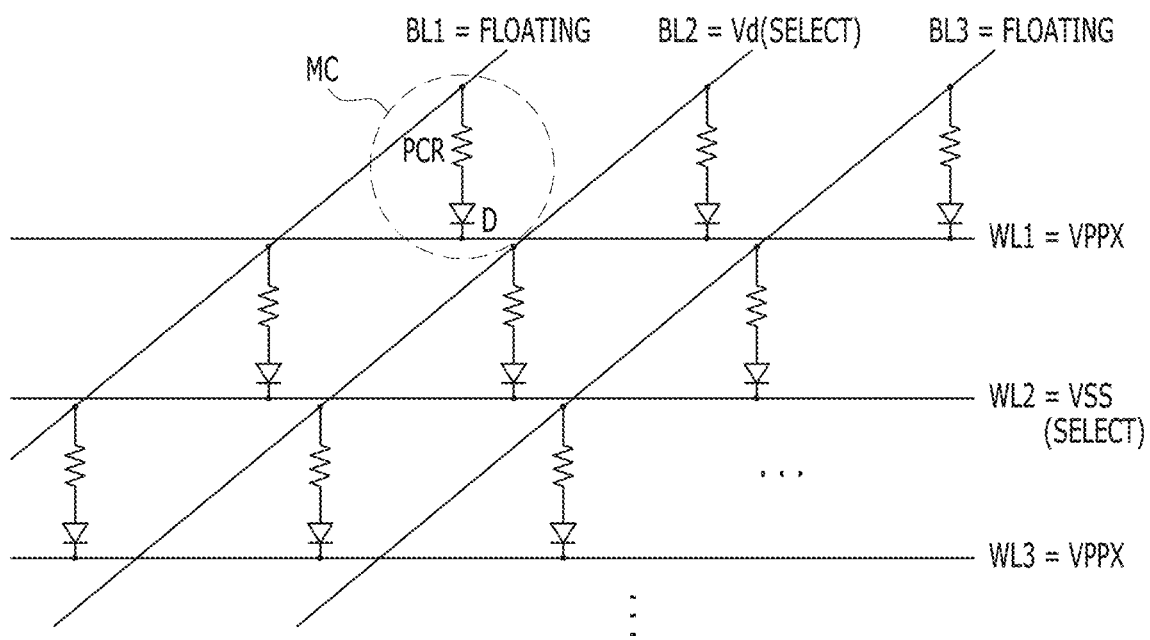
FIG. 1 is a diagram illustrating a memory cell array of a nonvolatile memory device.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

Figure 2:
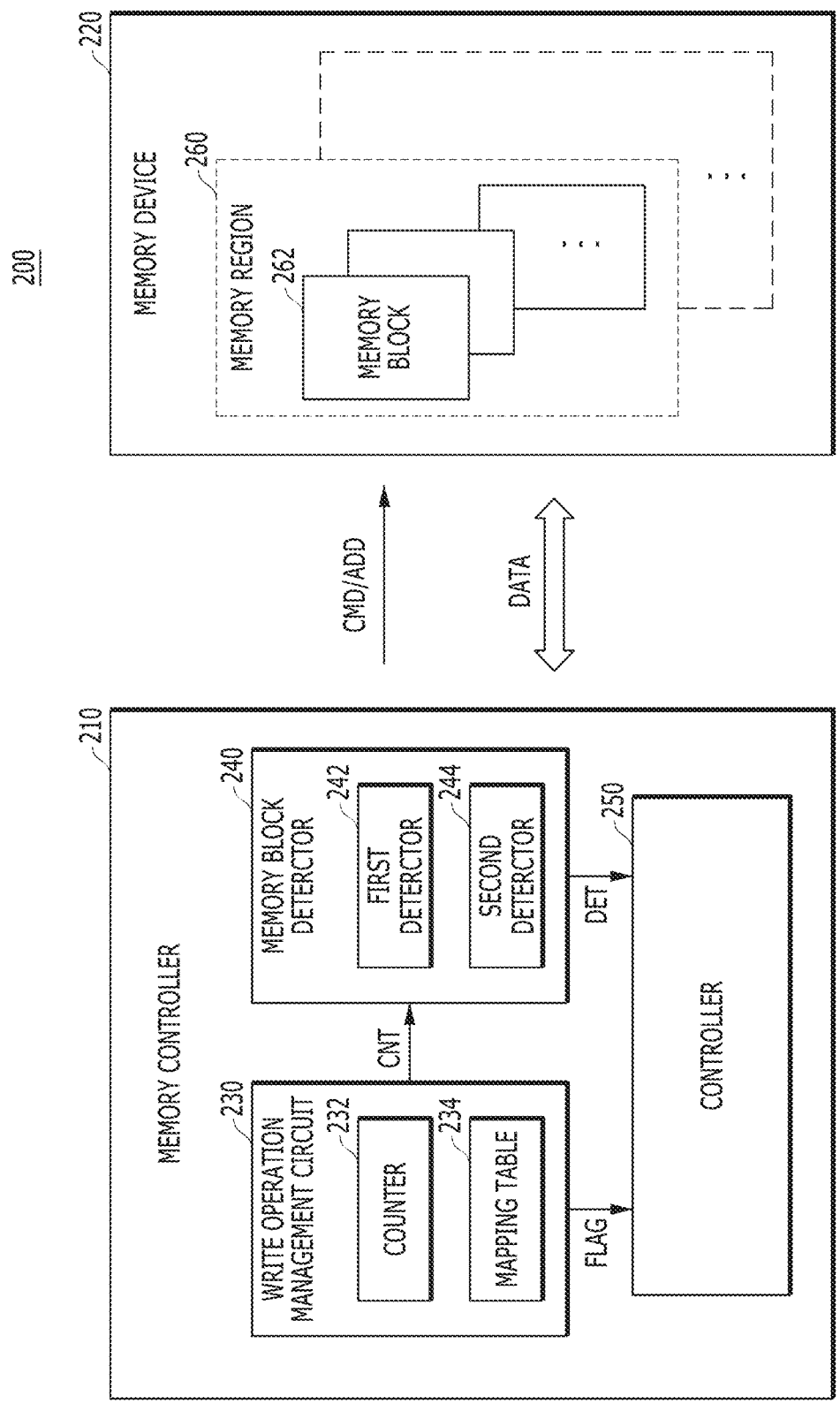
FIG. 2 is a block diagram illustrating a memory system in accordance with an embodiment.

FIG. 2 is a block diagram illustrating a memory system 200 in accordance with an embodiment. Referring to FIG. 2, the memory system 200 may include a memory controller 210 and a memory device 220.

The memory controller 210 may control the overall operation of the memory device 220 in response to a request from a host (not shown). For example, the memory controller 210 stores data DATA provided from the host, to the memory device 220, and provides data DATA read from the memory device 220, to the host. For this, the memory controller 210 may generate a command CMD and an address ADD and control operations such as a write operation, a read operation, and an erase operation of the memory device 220.

In addition, the memory controller 210 may perform various background operations for the memory device 220. The memory device 220 may be a higher integration memory device having higher storage capacity for a given volume. Generally, higher integration of the memory device 220, may mean increased interference between the word lines or the memory cells during a write operation which may lead to data disturbance wherein the data of certain memory cells may be changed. To prevent data loss, the memory controller 210 may detect regions on which disturbance may occur, based on the write operation performed on the memory device 220. Such regions are defined as victim regions, and their corresponding data are refreshed or rewritten before the data are changed. This operation of the memory controller 210 will be described in detail herein below.

The memory device 220 may be a PCRAM. However, the present disclosure is not limited to this. For example, the memory device may be any suitable nonvolatile memory such as an MRAM, a RRAM, and an FRAM. That is, the memory device 220 may retain stored data even when power is not supplied thereto. The memory device 220 may store data DATA provided from the host through a write operation and provide stored data DATA to the host through a read operation. The memory device 220 may include a plurality of memory blocks 262, each including a plurality of memory cells. The memory device 220 may include a plurality of memory regions 260 each of which is formed by grouping a plurality of memory blocks 262.

Referring to FIG. 2, the memory controller 210 in accordance with an embodiment may include a write operation management circuit 230, a memory block detector 240, and a controller 250.

The write operation management circuit 230 may check and update an operation count of write operations performed on the memory blocks 262. To this end, the write operation management circuit 230 may include a counter 232 and a mapping table 234. The counter 232 may count the write operations on each of the memory blocks 262. The mapping table 234 may store the write operation counts counted by the counter 232 according to an address of each of the memory blocks 262.

Furthermore, the write operation management circuit 230 may sum the write operation counts for each of the memory blocks 262, and calculate an average write operation count of the memory blocks 262 by dividing the sum value by the number of memory blocks 262. The calculated average write operation count may also be stored to the mapping table 234.

The write operation management circuit 230 may classify each of the memory regions 260 as a hot memory region or a cold memory region based on the operation count of write operations performed on all the memory blocks 262 of each region 260. For this, the write operation management circuit 230 may calculate a total write operation count for each of the memory regions 260 by summing the write operation counts of each of the memory blocks 262 included in each of the memory regions 260. The write operation management circuit 230 may store the calculated total write operation count to the mapping table 234, and classify the corresponding memory region 260 as a hot memory region or a cold memory region depending on whether or not the total write operation count is equal to or greater than a second reference value. Each of the memory regions 260 is classified either as a hot memory region or a cold memory region, and this information may be captured in a flag information FLAG of each of the memory regions 260. The flag information FLAG may be set to different values in the mapping table 234.

The memory block detector 240 may detect a first memory block, on which a write operation has been performed, and a second memory block adjacent to the first memory block among the plurality of memory blocks 262 as one of a hot memory block and a cold memory block, respectively, based on the write operation count of the memory blocks 262 that is updated by the write operation management circuit 230. The memory block detector 240 may include a first detector 242 and a second detector 244.

If a write operation is performed on the memory blocks 262, the write operation management circuit 230 may update the operation count CNT of write operations on the memory blocks 262, and store the operation count CNT to the mapping table 234. Then, the first detector 242 may detect as a hot memory block the first memory block, on which the write operation has been performed, among the memory blocks 262 based on the operation count CNT corresponding to the first memory block. In detail, if the operation count CNT of the first memory block is higher than the average write operation count of the memory blocks 262 by a first reference value or more, then the first detector 242 may detect the first memory block as the hot memory block.

If the hot memory block is detected by the first detector 242, the second detector 244 may detect as cold memory blocks the second memory blocks which are adjacent to the first memory block based on operation counts CNT of the second memory blocks. In detail, a memory block having an operation count CNT less than the average write operation count of the memory blocks 262 by the first reference value or more may be detected as the cold memory block among the second memory blocks.

If the hot memory block and the cold memory block are detected by the memory block detector 240, the controller 250 may copy data of the detected hot memory block or the detected cold memory block. If the first and second detectors 242 and 244 detect the hot memory block and the cold memory block, the memory block detector 240 may enable a detection signal DET. If the detection signal DET is enabled by the memory block detector 240, the controller 250 may check the flag information FLAG from the mapping table 234.

If, based on the flag information FLAG, the detected hot and cold memory blocks are included in a hot memory region, the controller 250 may copy the data of the detected cold memory block to an empty memory block, i.e., a free memory block, of a cold memory region of the plurality of memory regions 260. On the other hand, if, based on the flag information FLAG, the detected hot and cold memory blocks are included in a cold memory region, the controller 250 may copy the data of the detected hot memory block to a free memory block of a hot memory region of the plurality of memory regions 260.

The operation of the memory system 200 in accordance with the embodiment will be described in more detail with reference to FIGS. 3 and 4. The memory system 200 illustrated in FIG. 2 is only an embodiment, and the present disclosure is not limited thereto. For example, although the mapping table 234 has been illustrated in FIG. 2 as being included in the write operation management circuit 230, the mapping table 234 may be included in the memory controller 210 or other components of the memory controller 210 in accordance with an embodiment.

Figure 3B:
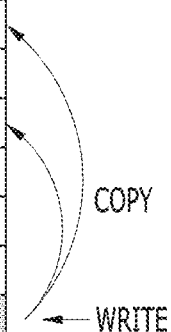

FIGS. 3A and 3B are diagrams illustrating the mapping table 234 shown in FIG. 2 according to the operation of the memory controller 210. FIG. 3A illustrates the case where a hot memory block and a cold memory block are detected from a hot memory region, and FIG. 3B illustrates the case where a hot memory block and a cold memory block are detected from a cold memory region. FIGS. 3A and 3B illustrate first to third memory regions RA1 to RA3 among the memory regions 260 of the memory device 220 by way of example.

Referring to FIGS. 2 and 3A, the mapping table 234 stores operation counts CNT obtained by counting the number of times write operations are performed on respective memory blocks BA1 to BA4. If a write operation is performed on the memory blocks BA1 to BA4, the write operation management circuit 230 may increase the corresponding operation count CNT by one for each memory block BA1 to BA4.

Here, the write operation management circuit 230 may sum the operation counts CNT of the memory blocks BA1 to BA4, and calculate an average write operation count AVG of the memory blocks BA1 to BA4 by diving the sum of the operation counts CNT by the number of the memory blocks BA1 to BA4. In FIG. 3A, in accordance with an embodiment, it may be checked that the average write operation count AVG of the memory blocks BA1 to BA4 is calculated as '50' and stored to the mapping table 234. Each time a write operation is performed on the memory blocks BA1 to BA4, in other words, each time the operation counts CNT for the memory blocks BA1 to BA4 are updated, the write operation management circuit 230 may calculate and update the average write operation count AVG.

Furthermore, each time a write operation is performed on the memory blocks BA1 to BA4, the write operation management circuit 230 may update a total write operation count TOTAL of write operations performed on the memory regions RA1 to RA3. The write operation management circuit 230 may perform an update operation by increasing the operation count CNT of a memory block on which the write operation has been performed, and simultaneously, increasing the total write operation count TOTAL of the corresponding memory region. In FIG. 3A, in accordance with an embodiment, it may be checked that the respective total write operation counts TOTAL of the first, second, and third memory regions RA1, RA2, and RA3 are stored as '1200', 1100' and '700'.

Furthermore, the write operation management circuit 230 may compare the total write operation count TOTAL of each of the memory regions RA1 to RA3 with a reference value. As a result of the comparison, if the total write operation count TOTAL is equal to or greater than the reference value, the corresponding memory region may be classified as a hot memory region. As a result of the comparison, if the total write operation count TOTAL is less than the reference value, the corresponding memory region may be classified as a cold memory region. In FIG. 3A, if it is assumed that the reference value is '1000', hence each of the first and second memory regions RA1 and RA2 may be classified as a hot memory region because the total write operation counts TOTAL thereof respectively are '1200' and 1100'. On the other hand, the third memory region RA3 may be classified as a cold memory region because the total write operation count TOTAL thereof is '700'. The write operation management circuit 230 may set the flag information FLAG of the hot memory region, i.e., the first and second memory regions RA1 and RA2, and the flag information FLAG of the cold memory region, i.e., the third memory region RA3, to different values, e.g., to '1' and '0', respectively.

Referring again to FIG. 3A, if a write operation is performed on any one memory block of the memory blocks 262, e.g., the third memory block BA3 of the second memory region RA2, the write operation management circuit 230 may update the mapping table 234. That is, the average write operation count AVG, the total write operation count TOTAL, the flag information FLAG, etc. may be updated along with the operation count CNT of the third memory block BA3 (shaded portions in FIG. 3A).

Thereafter, the first detector 242 may detect the hot memory block by checking the operation count CNT of the third memory block BA3 of the second memory region RA2. If the checked operation count CNT is greater than the average e operation count AVG of the memory blocks 262 by a reference value or more, the first detector 242 may detect the third memory block BA3 of the second memory region RA2 as the hot memory block. In FIG. 3A, if it is assumed that the reference value is '10', the third memory block BA3 of the second memory region RA2 may be detected as the hot memory block because the operation count CNT of the third memory block BA3 of the second memory region RA2 is '65' and the average write operation count AVG is '50'.

If the third memory block BA3 of the second memory region RA2 is detected as a hot memory block, the second detector 244 may then detect a cold memory block by checking the operation counts CNT of the memory blocks which are adjacent to the third memory block BA3 in the second memory region RA2, i.e., the second and fourth memory blocks BA2 and BA4 of the second memory region RA2. If the checked operation count CNT of each of the second and fourth memory blocks BA2 and BA4 is less than the average write operation count AVG of the memory blocks 262 by a reference value or more, then the second detector 244 may detect each of the second and fourth memory blocks BA2 and BA4 of the second memory region RA2 as a cold memory block. In FIG. 3A, if it is assumed that the reference value is '10', hence the fourth memory block BA4 of the second memory region RA2 is detected as a cold memory block because the operation counts CNT of the second and fourth memory blocks BA2 and BA4 of the second memory region RA2 are respectively '45' and '35' and the average write operation count AVG is '50'.

As the third and fourth memory blocks BA3 and BA4 of the second memory region RA2 are respectively detected as hot memory block and cold memory block, the controller 250 may copy data of the detected third or fourth memory block BA3 or BA4. Here, based on the flag information FLAG of the second memory region RA2, the controller 250 may check that the second memory region RA2 is a hot memory region. Therefore, the controller 250 may copy the data of the fourth memory block BA4 which is detected to be a cold memory block, to the cold memory region, i.e., the third memory region RA3. Particularly, the data of the fourth memory block BA4 may be copied to the third or fourth memory block BA3 or BA4 that is a free memory block of the third memory region RA3.

Hereinbelow, the case where a hot memory block and a cold memory block are detected from a cold memory region will be described with reference to FIG. 3B. In the description of FIG. 3B, explanation of parts set to the same values as those of FIG. 3A will be omitted. Unlike the example of FIG. 3A, it may be checked that the total write operation count TOTAL of the second memory region RA2 of FIG. 3B is stored as '900'. Therefore, the flag information FLAG of the second memory region RA2 may be set to '0', and the second memory region RA2 may be classified as a cold memory region.

As described with reference to FIG. 3A, if a write operation is performed on the third memory block BA3 of the second memory region RA2, the memory block detector 240 may detect the third and fourth memory blocks BA3 and BA4 of the second memory region RA2 as the hot and cold memory blocks, respectively. Therefore, the controller 250 may then copy the data of the detected third or fourth memory block BA3 or BA4.

Here, based on the flag information FLAG of the second memory region RA2, the controller 250 may check that the second memory region RA2 is a cold memory region. Consequently, the controller 250 may copy the data of the third memory block BA3 detected as a hot memory block, to a hot memory region, i.e., the first memory region RA1. Particularly, the data of the third memory block BA3 may be copied to the second or fourth memory block BA2 or BA4 that is a free memory block of the first memory region RA1.

Figure 4A:
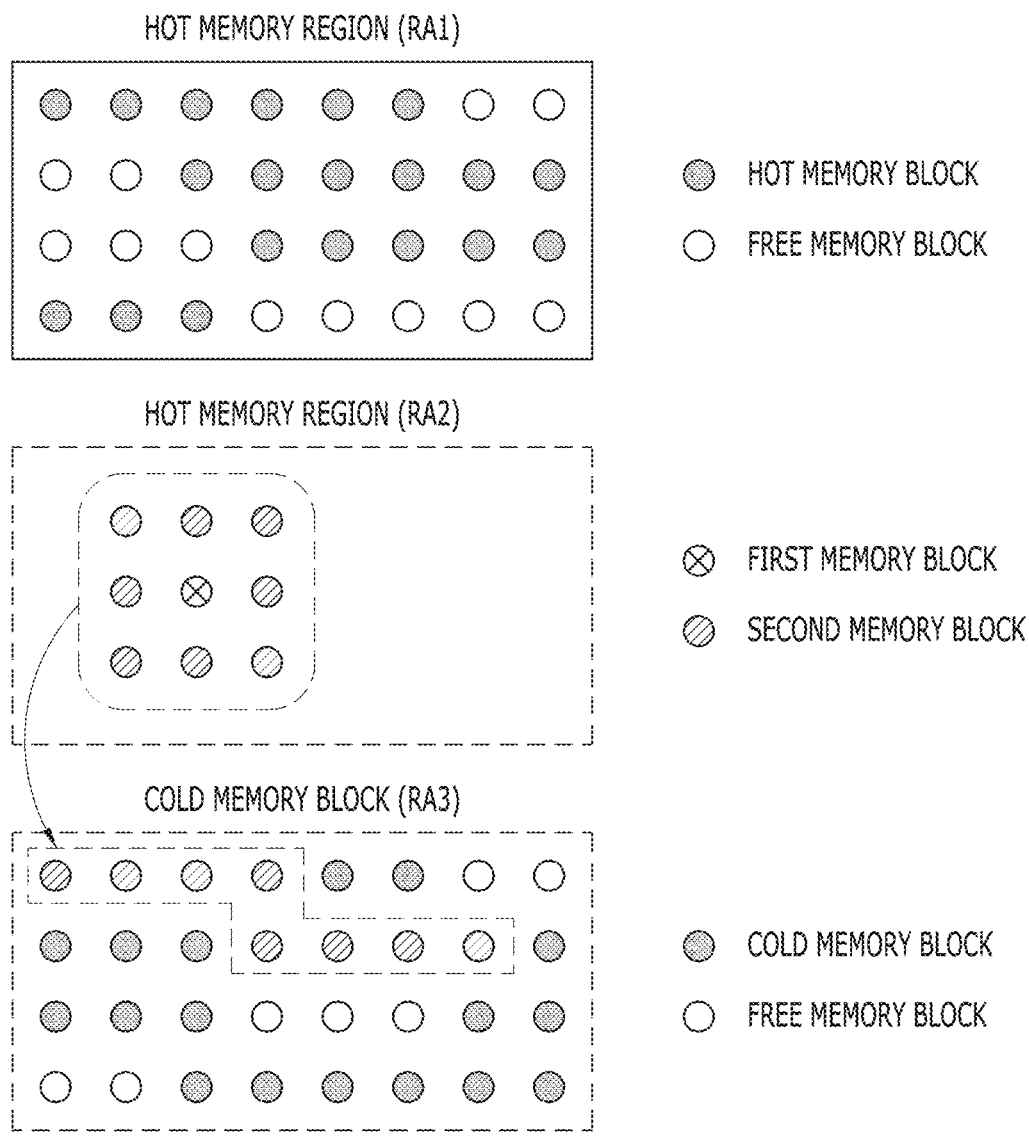
FIGS. 4A and 4B are diagrams illustrating an operation of copying data in a memory device illustrated in FIG. 2.
Figure 4B:
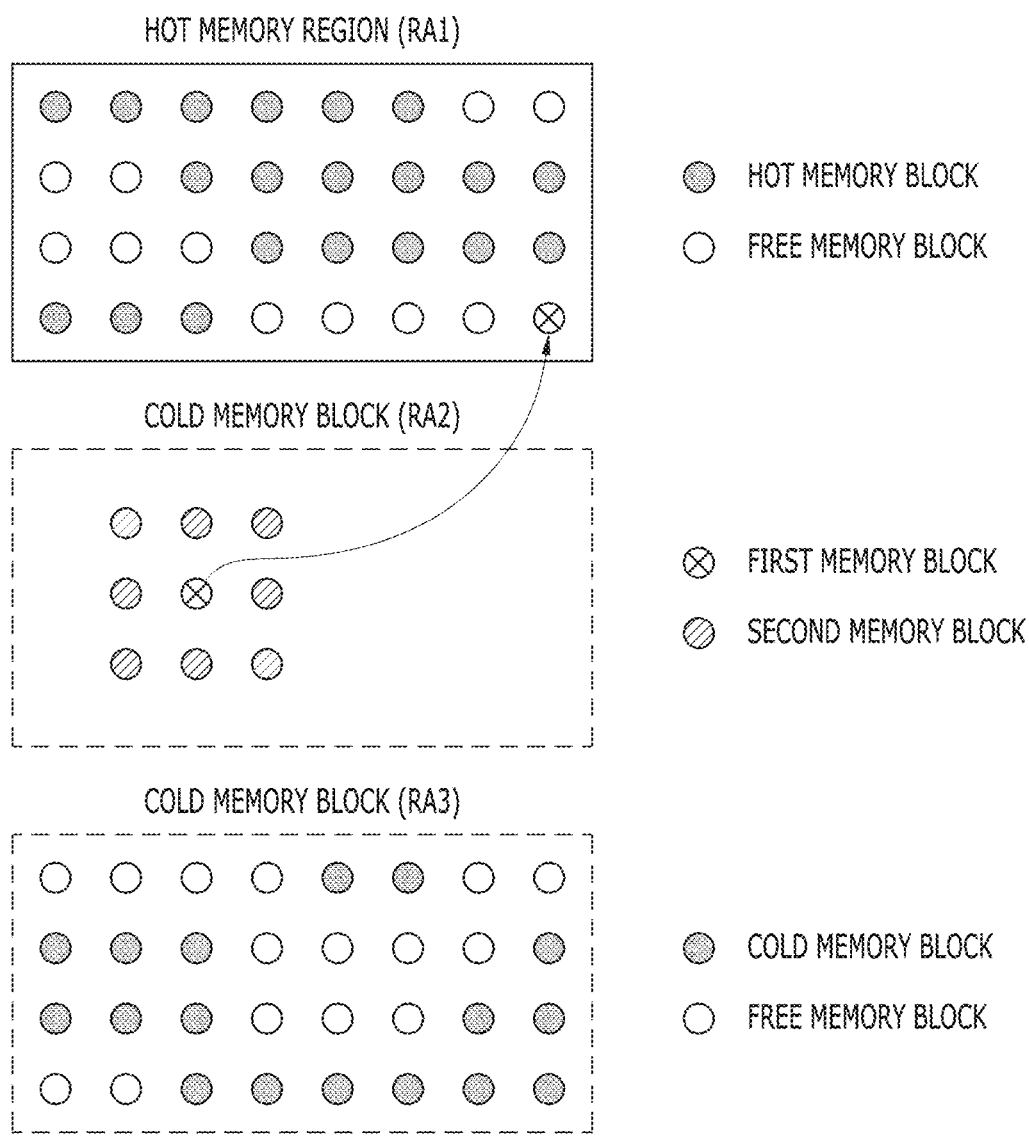

FIGS. 4A and 4B are diagrams illustrating an operation of copying data in the memory device 220 shown in FIG. 2 according to an operation of the memory controller 210. FIG. 4A illustrates the case where a hot memory block and a cold memory block are detected from a hot memory region, and FIG. 4B illustrates the case where a hot memory block and a cold memory block are detected from a cold memory region. FIGS. 4A and 4B illustrate first to third memory regions RA1 to RA3 among the memory regions 260 of the memory device 220 by way of example.

First, referring to FIG. 4A, it may be checked that each of the first and second memory regions RA1 and RA2 are classified as a hot memory region, and the third memory region RA3 is classified as a cold memory region. Furthermore, in the second memory region RA2, eight second memory blocks are disposed adjacent to a first memory block on which a write operation is performed.

In the case where the first memory block is detected as a hot memory block and all of the eight second memory blocks are detected as cold memory blocks, the data of the second memory blocks may be copied to the cold memory region RA3 because the second memory region RA2 is a hot memory region. In FIG. 4A, the controller 210 may further check that the data of the second memory blocks are copied to free memory blocks of the third memory region RA3.

Next, referring to FIG. 4B, the first memory region RA1 is classified as a hot memory region, and each of the second and third memory regions RA2 and RA3 is classified as a cold memory region. In the second memory region RA2, eight second memory blocks are disposed adjacent to a first memory block on which a write operation is performed.

In the case where the first memory block is detected as a hot memory block and all of the eight second memory blocks are detected as cold memory blocks, the data of the first memory block may be copied to the hot memory region RA1 because the second memory region RA2 is a cold memory region. In FIG. 4B, the controller 210 may further check that the data of the first memory block is copied to a free memory block of the first memory region RA1.

Figure 5:
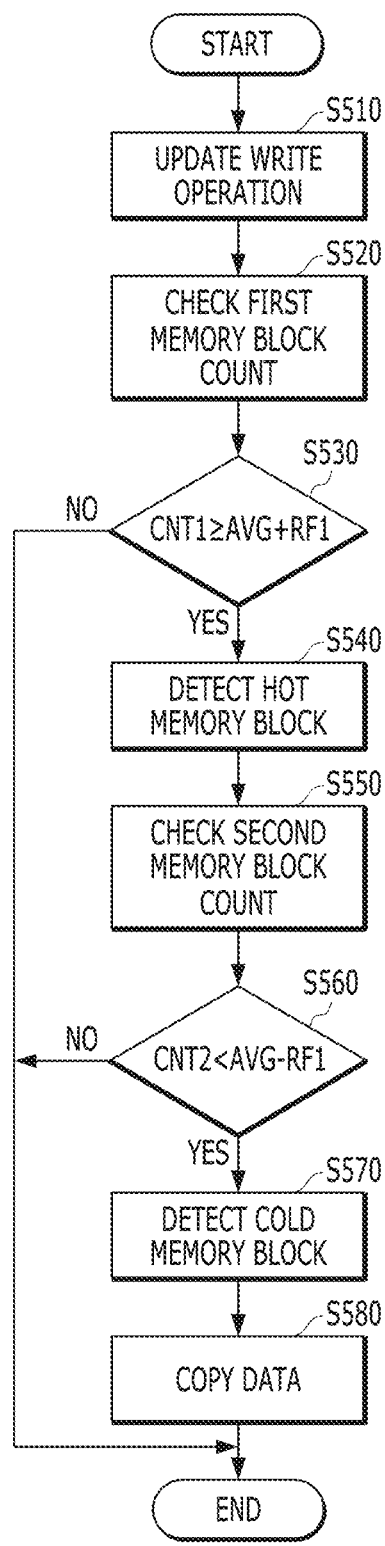
FIG. 5 is a flowchart illustrating an operation of the memory system in accordance with an embodiment.

FIG. 5 is a flowchart illustrating an operation of the memory system in accordance with an embodiment.

Update Write Operation at Step S510

The write operation management circuit 230 may update the write operation counts for the memory blocks 262 each time a write operation is performed. In other words, the write operation management circuit 230 may include the counter 232 and count the respective write operations of the memory blocks 262. The write operation management circuit 230 may sum the write operation counts for the memory blocks 262, and calculate an average write operation count of the memory blocks 262 by dividing the sum value by the number of memory blocks 262.

Moreover, the write operation management circuit 230 may calculate a total write operation count of each of the memory regions 260 by summing the respective write operation counts of the memory blocks 262 included in each of the memory regions 260. The write operation management circuit 230 may compare the total write operation count of each of the memory regions 260 with the second reference value. As a result of the comparison, among the memory regions 260, a memory region having a total write operation count equal to the second reference value or more may be classified as a hot memory region, and a memory region having a total write operation count less than the second reference value may be classified as the cold memory region.

Check Count and Detect Hot Memory Block at Steps S520 to S540

The memory block detector 240 may detect a hot memory block based on a first operation count value CNT1 corresponding to the write operation count of a first memory block on which a write operation has been performed, among the memory blocks 262. If the write operation management circuit 230 updates the write operation counts after the write operation is performed on the memory blocks 262, the first detector 242 of the memory block detector 240 may check the first operation count value CNT1 of the first memory block on which the write operation has been performed at step S520.

The first detector 242 may compare the first operation count value CNT1 with the average write operation count AVG of the memory blocks 262 at step S530. As a result of the comparison, if the first operation count value CNT1 is greater than the average write operation count AVG of the memory blocks 262 by a first reference value RF1 or more ("YES" at step S530), the first memory block may be detected as a hot memory block at S540.

Check Count and Detect Cold Memory Block at Steps S550 to S570

The memory block detector 240 may detect a cold memory block based on a second operation count value CNT2 corresponding to the write operation counts of second memory blocks adjacent to the first memory block among the memory blocks 262. If the first detector 242 detects the first memory block as a hot memory block, the second detector 244 of the memory block detector 240 may check a second operation count value CNT2 of each second memory block at step S550.

The second detector 244 may compare the second operation count value CNT2 with the average write operation count AVG of the memory blocks 262 at step S560. As a result of the comparison, if the second operation count value CNT2 is less than the average write operation count AVG of the memory blocks 262 by the first reference value RF1 or more ("YES" at step S560), the second detector 244 may detect the corresponding memory block as a cold memory block at step S570.

Copy Data at Step S580

If a hot memory block and a cold memory block are detected by the memory block detector 240, the controller 250 may copy data of the detected hot memory block or the detected cold memory block. For this, the controller 250 may check the flag information FLAG stored in the mapping table 234. If, based on the flag information FLAG, the hot and cold memory blocks are detected from a hot memory region, the controller 250 may copy the data of the detected cold memory block to a free memory block of a cold memory region. Alternatively, if, based on the flag information FLAG, the hot and cold memory blocks are detected from a cold memory region, the controller 250 may copy the data of the detected hot memory block to a free memory block of a hot memory region.

Consequently, if data copy operations are continuously performed in accordance with the embodiment, a hot memory block detected from a hot memory region of the memory device may remain as it is, and a hot memory block detected from a cold memory region may be copied to a hot memory region. On the other hand, a cold memory block detected from a cold memory region may remain as it is, and a cold memory block detected from a hot memory region may be copied to a cold memory region. Therefore, hot memory blocks of which write operation counts are comparatively high may gather together, and cold memory blocks of which write operation counts are comparatively low may gather together. Consequently, disturbance may be prevented from occurring due to a difference in the frequency of write operations between adjacent memory blocks of the memory device.

In various embodiments, a memory device is divided into a plurality of memory blocks having the same size. Based on degrees of write operations between a hot memory block on which write operations are frequently performed and memory blocks adjacent to the hot memory block, data of each of the memory blocks is copied to another memory block. Particularly, in the case where the operation count of write operations performed on a certain memory block is relatively high, data of the corresponding memory blocks is copied depending on a difference in write operation count between adjacent memory blocks in order to reduce influence on memory blocks surrounding the certain memory block.

Here, in the case where memory blocks having write operation counts which differ by at least a reference count are included in a region on which a comparatively large number of write operations have been performed, data of a memory block having a write operation count which is comparatively low, i.e., data of a cold memory block, may be copied. In the case where memory blocks having write operation counts which differ by at least a reference count are included in a region on which a comparatively small number of write operations have been performed, data of a memory block having a write operation count which is comparatively high, i.e., data of a hot memory block, may be copied. Therefore, memory blocks of which the degrees of write operations are similar to each other may be gathered in one memory region, whereby influence between adjacent memory blocks may be reduced.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device including a plurality of memory blocks;
   a write operation management circuit configured to update write operation counts for the plurality of memory blocks;
   a first block detector configured to detect a hot memory block based on a first operation count value corresponding to the write operation count of a first memory block on which a write operation has been performed among the plurality of memory blocks;
   a second detector configured to detect a cold memory block from second memory blocks adjacent to the first memory block that is detected as the hot memory block, based on a second operation count value corresponding to the write operation count of each of the second memory blocks; and
   a controller configured to copy, if the hot memory block and the cold memory block are detected by the first and second detectors, data of the detected hot memory block or data of the detected cold memory block.

2. The memory system of claim 1, wherein, when the write operation management circuit updates the write operation counts for the plurality of memory blocks, the first detector detects the first memory block as the hot memory block if the first operation count value is greater than an average write operation count of the plurality of memory blocks by a first reference value or more.

3. The memory system of claim 2, wherein, when the first detector detects the first memory block as the hot memory block, the second detector detects, as the cold memory block, a memory block, of which the second operation count value is less than the average write operation count of the plurality of memory blocks by the first reference value or more, among the second memory blocks.

4. The memory system of claim 1, wherein the write operation management circuit comprises:
   a counter configured to count the write operation counts for the plurality of memory blocks; and
   a mapping table configured to store a relationship between addresses of the plurality of memory blocks and the counted write operation counts.

5. The memory system of claim 4, wherein the write operation management circuit sums the counted write operation counts for the plurality of memory blocks and stores a value obtained by dividing the sum of the write operation counts by the number of the memory blocks, to the mapping table as an average write operation count of the plurality of memory blocks.

6. The memory system of claim 1, wherein the memory device includes a plurality of memory regions each of which is formed by grouping the plurality of memory blocks.

7. The memory system of claim 6, wherein the write operation management circuit classifies each of the plurality of memory regions as a hot memory region or a cold memory region depending on whether or not a total write operation count of the corresponding memory region is a second reference value or more.

8. The memory system of claim 7,
   wherein, when the hot memory block and the cold memory block are detected from a hot memory region, the controller copies the data of the detected cold memory block to a free memory block of the cold memory region, and
   wherein, when the hot memory block and the cold memory block are detected from a cold memory region, the controller copies the data of the detected hot memory block to a free memory block of the hot memory region.

9. The memory system of claim 7, wherein the write operation management circuit comprises:
   a counter configured to count the write operation counts for the plurality of memory blocks; and
   a mapping table configured to store a relationship between addresses of the plurality of memory blocks and the counted write operation counts.

10. The memory system of claim 9, wherein the write operation management circuit stores a value obtained by summing the counted write operation counts for the memory blocks included in each of the memory regions, to the mapping table as the total write operation count of the corresponding memory region.

11. An operating method for a memory system comprising:
    updating write operation counts for a plurality of memory blocks according to a write operation;
    detecting a hot memory block based on a first operation count value corresponding to the write operation count of a first memory block on which the write operation has been performed among the plurality of memory blocks;
    detecting a cold memory block from second memory block adjacent to the first memory block that is detected as the hot memory block, based on a second operation count value corresponding to the write operation count of each of the second memory blocks; and
    copying, if the hot memory block and the cold memory block are detected, data of the detected hot memory block or data of the detected cold memory block.

12. The operating method of claim 11, wherein the detecting of the hot memory block comprises:
    checking the first operation count value when the write operation counts for the plurality of memory blocks are updated;
    comparing the checked first operation count value with an average write operation count of the plurality of memory blocks; and
    detecting the first memory block as the hot memory block when the checked first operation count value is greater than the average write operation count by a first reference value or more as a result of the comparing.

13. The operating method of claim 12, wherein the detecting of the cold memory block comprises:
    checking the second operation count value when the first memory block is detected as the hot memory block;
    comparing the checked second operation count value with the average write operation count of the plurality of memory blocks; and
    detecting, as the cold memory block, a memory block, of which the checked second operation count value is less than the average write operation count of the plurality of memory blocks by the first reference value or more, among the second memory blocks.

14. The operating method of claim 11, wherein the updating of the write operation counts for the plurality of memory blocks comprises:
    counting the write operation counts for the plurality of memory blocks;
    summing the counted write operation counts for the plurality of memory blocks; and obtaining an average write operation count of the plurality of memory blocks by dividing the sum of the write operation counts by the number of the memory blocks.

15. The operating method of claim 11, wherein the memory system includes a plurality of memory regions each of which is formed by grouping the plurality of memory blocks.

16. The operating method of claim 15, further comprising:
comparing a total write operation count of each of the plurality of memory regions with a second reference value;
classifying, as a hot memory region, a memory region having a total write operation count is the second reference value or more among the plurality of memory regions as a result of the comparing; and
classifying, as a cold memory region, a memory region having a total write operation count is less than the second reference value among the plurality of memory regions as a result of the comparing.

17. The operating method of claim 16, wherein the copying of the data of the detected hot memory block or the data of the detected cold memory block comprises:
copying, when the hot memory block and the cold memory block are detected from a hot memory region, the data of the detected cold memory block to a free memory block of the cold memory region; and
copying, when the hot memory block and the cold memory block are detected from a cold memory region, the data of the detected hot memory block to a free memory block of the hot memory region.

18. The operating method of claim 16, wherein the updating of the write operation counts for the plurality of memory blocks comprises:
counting the write operation counts for the plurality of memory blocks; and
obtaining the total write operation count of each of the memory regions by summing the counted write operation counts for the memory blocks included in the corresponding memory region.

19. A memory system comprising:
a memory device including a plurality of memory regions, each of which is formed of a plurality of memory blocks;
a memory block detector configured to detect, based on write operation counts for the plurality of memory blocks, a first memory block on which a write operation has been performed among the plurality of memory blocks as a hot memory block, and a second memory block adjacent to the first memory block that is detected as the hot memory block as a cold memory block; and
a controller configured to copy, if the hot memory block and the cold memory block are detected by the memory block detector, data of the detected hot memory block or data of the detected cold memory block.

20. The memory system of claim 19, further comprising a write operation management circuit configured to classify each of the plurality of memory regions as a hot memory region or a cold memory region, based on the write operation counts for the plurality of memory blocks,
wherein, when the hot memory block and the cold memory block are detected from a hot memory region, the controller copies the data of the detected cold memory block to a free memory block of the cold memory region, and
wherein, when the hot memory block and the cold memory block are detected from the cold memory region, the controller copies the data of the detected hot memory block to a free memory block of the hot memory region.

21. A memory system comprising:
a memory device including a plurality of memory regions each having a plurality of memory blocks; and
a controller suitable for:
detecting hot and cold memory regions among the memory regions at a program operation to one of the memory blocks;
determining whether a currently programmed memory block is a hot memory block;
determining, when the currently programmed memory block is determined as the hot memory block, whether one or more of memory blocks adjacent to the currently programmed memory block are cold memory blocks; and
controlling the memory device to copy data of the hot and cold memory blocks into empty memory blocks of the hot and cold memory regions, respectively.

22. The memory system of claim 21, wherein the controller is controlling the memory device to perform at least one of the following operations:
copying a hot memory block detected from a cold memory region to a hot memory region,
copying a cold memory block detected from a hot memory region to a cold memory region,
keeping a hot memory block detected from a hot memory region to the hot memory region, and
keeping a cold memory block detected from a cold memory region to the cold memory region,
so that hot memory blocks gather together, and cold memory blocks gather together to prevent disturbance due to a difference in the frequency of write operations between adjacent memory blocks of the memory device.

* * * * *